Patented Dec. 3, 1935

2,023,110

UNITED STATES PATENT OFFICE 2,023,110

MOTOR FUEL DISTILLATE

Robert E. Wilson, Chicago, Ill., assignor, by mesne assignments, to Gasoline Antioxidant Company, Wilmington, Del., a corporation of Delaware No Drawing. Application May 2, 1932, Serial No. 608,848

7 Claims. (Cl. 44—9)

The present invention relates to the treatment of highly cracked gasolines or hydrocarbon motor fuel distillates of the type which are normally unstable, particularly with respect to gum formation on storage and on evaporation and which, having an initial anti-knock rating superior to that of straight-run gasoline, tend to deteriorate in anti-knock rating on storage. It is particularly concerned with the highly cracked motor fuel products such as those derived by high temperature cracking, say at temperatures of 900° F. and higher and more particularly by such processes conducted at lower pressures and commonly designated vapor phase processes. The tendency of products of this type to develop gum-forming constituents and to deteriorate in anti-knock is indicated, for example, by their oxygen absorption induction period, determined, for example, as described in the article by Voorhees and Eisinger in Proceedings of the American Petroleum Institute, Sec. II for January 3, 1929, page 170, the oxygen absorption induction period designating the period of time for which the rate of absorption of oxygen at an elevated temperature of 210 to 212° F. on agitation in an atmosphere of oxygen under 2.5 atmospheres pressure remains below 1 cc. per minute per 100 cc. motor fuel.

It has hitherto been proposed to prevent the deterioration of such products, which are normally color stable, by incorporating therein minute proportions of aromatic inhibiting agents, such as alpha-substituted naphthalene derivatives, for example, alpha-naphthol, alpha-naphthylamine and paraphenylenediamine, and the like. It has been found, however, that the incorporation of such agents preventing gum formation and deterioration of anti-knock causes instability of color of the initially color stable material, with the result that the color thereof rapidly goes off or becomes darker on exposure to either direct sunlight or diffused sunlight.

It has now been found that color degradation of such treated products may be prevented by incorporating therein small proportions of polyphenols, such as hydroquinone, pyrogallol, gallic acid, resorcinol, catechol and the like. The proportion of the polyhydric phenol incorporated may vary from 0.0005% to 0.05% or more, only sufficient being employed, of course, to secure the desired color stabilizing effect without modifying the effect of the alpha-substituted naphthalene derivative with respect to prevention of gum formation. In general, from 0.001% to 0.005% of the polyphenolic body is found to be sufficient. The following example illustrates the invention:

An initial stock was prepared, sweetened and treated, showing satisfactory color stability but showing a high gum test and developing gum-forming constituents rapidly on storage. Its oxygen absorption induction period was about 100 min. Substantial color stability was indicated by the fact that on 38 days exposure to diffused light, it changed only from an initial color of 25 to a color of 20. When 0.005% of alpha-naphthol was added in order to impart substantial stability with respect to gum formation and to prevent deterioration in anti-knock, the oxygen absorption induction period was increased thereby to about 400 minutes. The product, thus treated, was found to have lost color stability, degrading in a similar period of 38 days exposure to diffused light from an initial color of 25 to a final color of 3. By adding thereto 0.005% pyrogallol, the stability of the product with respect to gum formation and anti-knock rating resulting from the use of the alpha-naphthol was maintained and color stability was likewise imparted, as indicated by a degradation in color in the same period of 38 days exposure to diffused light of only from an initial color of 25 to a final color of 22.

With another stock of the same type, untreated, with inhibitor on exposure to direct sunlight for five days, the color dropped from an initial value of 23 to a value of 21. On treatment with 0.005% alpha-naphthol, in the same period, the color degraded from an initial value of 23 to a final value of 9. Upon adding to the treated stock 0.003% of hydroquinone, the color degradation under similar conditions for the same period was substantially decreased, the initial color being 23 and the final color 17. The addition of gallic acid to the same treated stock likewise substantially retarded the color degradation, 0.003% of gallic acid added to the alpha-naphthol-treated stock reducing the color degradation over the same period of 5 days' exposure to direct sunlight from an initial value of 23 to a final value of 15.

Similar results are secured by the use of polyhydric phenols as hereinbefore indicated, in counteracting the color degradation resulting from the employment of other alpha-substituted naphthalene derivatives employed to stabilize a stock initially unstable with regard to gum formation and deterioration. For example, a cracked gasoline had an initial color of 26 Saybolt and after 3 days' exposure to light the color fell to 24. To another sample of this gasoline there was added .01% alpha-naphthylamine for the purpose of preventing gum formation. The color of the gasoline was not changed by the alpha-naphthylamine but on exposure to light for 3 days it developed a color of 12° Saybolt. Simultaneously, with the above light stability tests there were conducted additional tests on the alpha-naphthylamine-containing gasoline to which was added in one case .005% of hydroquinone and in the other case .002% of pyrogallol. Neither of these secondary stabilizers affected the initial color of the gasoline but the samples so treated exhibited a marked increase in color stability. After 3 days' exposure to light the hydroquinone-treated sample had a color of 21 and the pyrogallol treated sample 17 Saybolt, in comparison with the sample containing alpha-naphthylamine alone which had developed a color of 12 Saybolt as previously mentioned.

A sample of the same gasoline referred to in the previous example was stabilized against gum formation by the addition of approximately .004% of paraphenylenediamine. Although having an initial color of 26 Saybolt, on exposure to light for 3 days a color of 9 was developed and in 5 days the Saybolt color fell to approximately 2. Simultaneously a sample of this inhibited gasoline was treated with .002% of pyrogallol which had no effect on the initial color but exerted an astonishing effect on the color stability on exposure to light. After 3 days' exposure this gasoline exhibited a color of at least 25 Saybolt which remained unchanged even after five days' exposure to light.

Although the present invention has been described in connection with the details of certain specific examples thereof, it is not intended that these shall be regarded as limitations upon the scope of the invention, except insofar as included in the accompanying claims.

I claim:

1. The method of imparting color stability to a cracked hydrocarbon motor fuel containing a small proportion of an added gum formation inhibiting agent selected from the class consisting of alpha-naphthol, alpha-naphthylamine, and para-phenylenediamine which tends to cause color degradation in the fuel, which comprises adding thereto along with the gum inhibiting agent a small proportion of a polyhydroxy benzene compound in quantity sufficient to retard said color degradation.

2. The method of imparting color stability to a cracked hydrocarbon motor fuel containing a small proportion of an added gum formation inhibiting agent selected from the class consisting of alpha-naphthol, alpha-naphthylamine and para-phenylenediamine which tends to cause color degradation in the fuel, which comprises adding thereto along with the gum inhibiting agent a small proportion of a polyhydroxy benzene compound selected from the group consisting of pyrogallol, hydroquinone, catechol, and gallic acid, in quantity sufficient to retard said color degradation.

3. A motor fuel product comprising a cracked hydrocarbon distillate and a small proportion of alpha-naphthol as a gum formation inhibiting agent, whereby the fuel product is rendered unstable with respect to color formation, together with a small proportion of a polyhydroxy benzene in quantity sufficient to retard said color formation.

4. A motor fuel product comprising cracked gasoline and a small proportion of alpha-naphthol as a gum formation inhibiting agent, whereby the gasoline is rendered unstable with respect to color formation, together with a small quantity of catechol in quantity sufficient to retard said color formation.

5. A motor fuel product comprising cracked gasoline and a small proportion of alpha-naphthol as a gum formation inhibiting agent, whereby the gasoline is rendered unstable, together with a small proportion of a polyhydroxy benzene compound in quantity sufficient to retard said color formation.

6. A motor fuel product comprising cracked gasoline and a small proportion of alpha-naphthylamine as a gum formation inhibiting agent, whereby the gasoline is rendered unstable with respect to color formation, together with a small proportion of a polyhydroxy benzene compound in quantity sufficient to retard said color formation.

7. A motor fuel product comprising cracked gasoline and a small proportion of para-phenylenediamine as a gum formation inhibiting agent, whereby the gasoline is rendered unstable with respect to color formation, together with a small proportion of a polyhydroxy benzene compound in quantity sufficient to retard said color formation.

ROBERT E. WILSON.